United States Patent [19]
Schultz et al.

[11] Patent Number: 5,983,298
[45] Date of Patent: *Nov. 9, 1999

[54] INDUSTRIAL CONTROLLER PERMITTING REMOVAL AND INSERTION OF CIRCUIT CARDS WHILE UNDER POWER

[75] Inventors: Ronald E. Schultz, Solon; William E. Floro, Willoughby; Otomar Schmidt, Richmond Heights, all of Ohio

[73] Assignee: Allen-Bradley Company, LLC, Milwaukee, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/561,506

[22] Filed: Nov. 20, 1995

[51] Int. Cl.$^6$ .................................................. G06F 13/00
[52] U.S. Cl. .......................... 710/103; 710/102; 710/2; 713/300; 714/48; 439/43
[58] Field of Search ................... 395/750.01, 183.18, 395/282, 283, 182.22, 183.2; 365/229, 226, 228; 307/131; 439/43, 92; 714/48; 710/2

[56] References Cited

U.S. PATENT DOCUMENTS

| | | |
|---|---|---|
| 4,882,702 | 11/1989 | Struger et al. ........................... 710/2 |
| 5,537,584 | 7/1996 | Miyai et al. . |
| 5,568,610 | 10/1996 | Brown ...................................... 714/48 |
| 5,589,719 | 12/1996 | Fiset . |

Primary Examiner—Meng-Ai T. An
Assistant Examiner—Rupal D. Dharia
Attorney, Agent, or Firm—Keith M. Baxter; John M. Miller; John J. Horn

[57] ABSTRACT

A circuit card of an industrial controller may be removed or inserted under power without loss of memory or disturbance to the power supplies of other modules through the use of a power failure signal derived from shortened pins on the connector between the card and the industrial controller. The power failure signal activates a timer delaying connection of the board components to power until the physical connection between the card and the industrial controller has stabilized. At this time current drain is ramped up by a controlling series FET. Upon removal of the card, the power failure signal causes outputs of an on-board microprocessor to be pulled to particular states necessary to prevent disturbance of a battery backed-up RAM and to eliminate current flow through protection diodes on other memory type devices attached to the microprocessor.

4 Claims, 5 Drawing Sheets

INDUSTRIAL CONTROLLER PERMITTING REMOVAL AND INSERTION OF CIRCUIT CARDS WHILE UNDER POWER

FIELD OF THE INVENTION

The present invention relates to industrial controllers for the real-time control of industrial processes and, in particular, to an industrial controller that permits its component circuit cards to be removed and inserted while the industrial controller is under power.

BACKGROUND OF THE INVENTION

Industrial controllers are special purpose computers used for controlling industrial processes or manufacturing equipment.

Under the direction of a stored program, the industrial controller examines a series of inputs reflecting the status of a controlled process or controlled equipment and changes outputs affecting control of the process or equipment. The inputs and outputs are mostly binary, that is "ON" or "OFF"; however, analog inputs and outputs taking on a continuous range of values and multi-bit digital values, are also used.

Industrial controllers are frequently assembled from individual functional modules that fit within a rack to be joined together by means of a common backplane. A circuit card within the functional module has conducting fingers to engage a multi-line connector attached to the backplane and the backplane supplies power to the functional modules and a number of parallel conductors for data communication between the functional modules.

By dividing the operation of the industrial controller among the functional modules, the industrial controller may be flexibly configured to meet a given controlled task. For example the processing unit of the industrial processor may be one circuit card and separate from the input and output circuits for receiving data from and transmitting data to the industrial process. If additional I/O lines are needed, additional I/O cards may be inserted within the rack.

The modularity of the industrial controller also improves its serviceability. A failure in a given component may be isolated by "swapping" circuit cards in and out of the rack to see if the problem is remedied. In most cases only a single card will have faulted and that card alone may be replaced, reducing the cost of the repair.

Ideally, the removal and replacement of the circuit cards of the industrial controller could be done while the industrial controller is operating under power. The capability for removal and insertion under power (RIUP) decreases the time necessary to isolate a given fault, and in some cases permits some portions of the industrial process to continue to operate while a repair is being undertaken.

Permitting the removal or insertion of circuit cards while the industrial controller is under power is not a simple matter. First, the circuit cards normally contain an electronic processor and an associated, volatile electronic memory. Removal of the power to such a memory erases its contents, rendering the board inoperable until the memory is reprogrammed, making board swapping impractical. One method of solving this problem is to provide an on-board backup battery for the memory.

One problem with this approach of using a backup battery is that in order to conserve battery power the remainder of the devices on the board, including those connected to the memory, are allowed to lose power. The outputs of these connected devices may move to undefined logic levels as power drops. An undefined logic level is a voltage that is not high enough to be reliably interpreted as a logical true nor low enough to be reliably interpreted as a logical zero. These undefined logic levels can cause an unintended writing to the electronic memory of spurious data or can cause the electronic memory to enter a state of extremely high current drain from the backup battery. This high drain current can lower the battery voltage to the point where the electronic memory loses its stored information.

One method of avoiding this problem is to install a set of electronic switches between the volatile electronic memory and the devices providing outputs to that memory (typically the electronic processor) to completely disconnect the processor from the memory when a power loss is detected.

Nevertheless, while this method prevents high current drain or unintentional writing to the electronic memory during power failure, the electronic switches introduce a transmission delay in signals passing through the switches (a gate delay) slowing the speed of reading or writing the memory and thus slowing the operation of the functional module.

Figure 11:
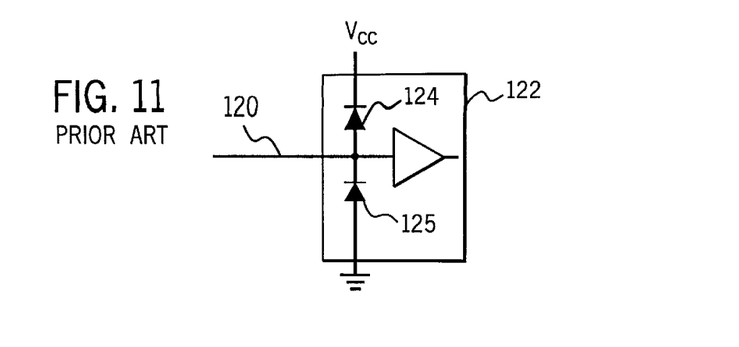

Providing additional battery backup to the processor, besides unduly increasing the battery drain, can provide problems with the input protection circuitry of other devices connected to the electronic processor, particularly with processor output signals that are de-asserted at a logical high level. Referring to FIG. 11, other devices such as EPROM or PROM, connected to the electronic memory but not provided with battery backup, have diodes 124 and 125 connected between their inputs 120 and ground and $V_{cc}$. These diodes are oriented to safely conduct out-of-range voltages away from the input by conducting voltages higher than $V_{cc}$ to $V_{cc}$ and lower than ground to ground. As $V_{cc}$ drops however, a current may flow from the de-asserted lines of the processor providing the input 120 (supported by the battery backup voltage) through the diodes 124 to the falling $V_{cc}$. Thus, if the voltage on input 120 exceeds $V_{cc}$, current will flow through protection diodes 124.

A second obstacle to the removal and insertion of circuit cards while the industrial controller is under power is electrical arcing that may damage the connector attaching the circuit card to the backplane. Normally the circuit card will have a number of filter capacitors which present a very low impedance to the power supply in the backplane when the circuit card is first installed. The resulting high inrush of current may etch or pit the electrical connector joining the circuit card to the backplane reducing its reliability.

Figure 10:
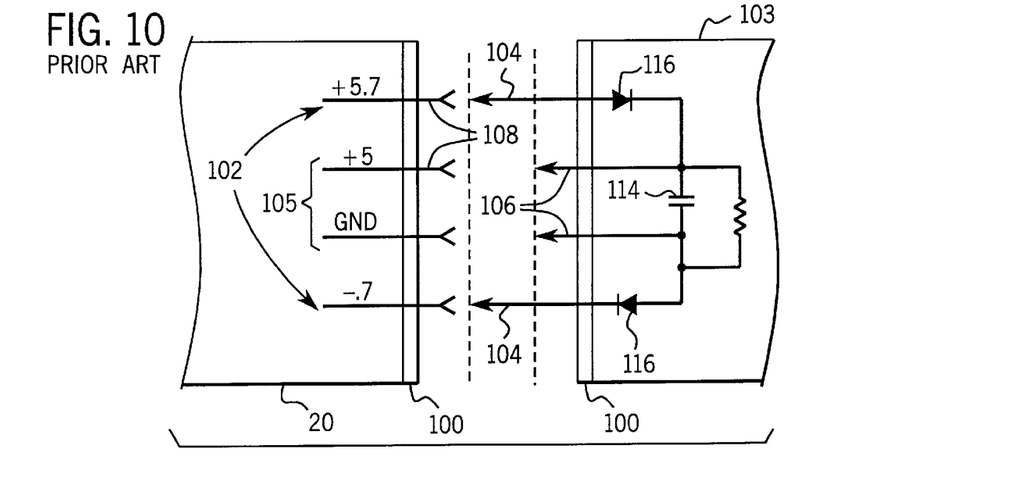
FIGS. 10 and 11 show prior art circuit elements described in the background of the present invention.

Finally, this large inrush of current may produce a momentary decrease in the regulated power supply feeding another circuit card thus adversely affecting the operation of the other card. One method of eliminating the latter problem of high momentary loading of the backplane power supply is shown in FIG. 10. Here the connector 100 joining the circuit card 103 to the backplane 20 employs long connector pins 104 and short connector pins 106 on one-half of the connector 100 which connect with equal height sockets 108 on the other half of the connector 100. The long connector pins 104 provide electrical connection to corresponding sockets 108 before the short connector pins 106 provide such connection as the circuit card 103 is inserted into the backplane 20.

During an insertion of the circuit card 103, the long pins 104 first connect the circuit card 103 to a precharging power supply 102 that is isolated from a main operating supply 105 used by the circuit card 103 during normal operation. The precharging power supply 102 charges the filter capacitances associated with the card 103. Moments later, the short pins 106 connect with the main operating supply 105 after the filter capacitance 114 has been fully charged. Thus, there is no disturbance to the main power supply 105.

When another circuit card is inserted, the precharging supply 102 may experience a downward voltage spike caused by the low impedance of the charging capacitance 114. This drop in voltage is isolated from the other circuit cards firmly connected to the main power supply 105 by diodes 116 which prevent current flow from the main power supply 105 to the precharging power supply 102. The precharging power supply 102 operates at a higher voltage to compensate for the voltage drop across diodes 116.

Nevertheless, this precharging technique also has drawbacks. First, the long pins 104 still experience large charging currents which may cause pitting to those pins. Second, if the circuit card 103 is inserted too quickly, the long pins 104 will not be connected for sufficient time to fully charge the capacitance 114. Third, if the circuit card 103 is inserted too slowly or not fully seated, the circuit card 103 may begin operating on the precharging power supply instead of the main power supply 105 and thus be susceptible to disturbances in that supply caused by the insertion of other cards. The precharging power supply 102 is supplied by relatively small traces to allow more backplane copper for the main power supply 105 and hence experiences greater voltage drops with changes in current demanded. Fourth, the precharging technique requires redundant backplane traces, connector pins and power supplies.

SUMMARY OF THE INVENTION

The present invention provides a circuit card for an industrial controller that is more robust to removal and insertion while the industrial controller is under power. Generally, the circuit card tests for electrical connections of multiple pins of its connector and then electronically delays a power connection until the electrical connection of the pins has stabilized. Once the connection has stabilized, the power is ramped up slowly to prevent disturbances of the power to other adjacent cards.

Upon removal of the circuit card, any volatile memory associated with the circuit card's processor is preserved with a battery backup. The same multiple pins of the connector provide an indication that the card is being disconnected before complete disconnection occurs. The lines to the electronic memory are pulled to ground except for the chip select line which is placed in a high impedance mode and allowed to be pulled up by an external pull up resistor to the battery backup voltage. High current consumption and erroneous writing to the memory is thus avoided.

Specifically then, the present invention includes a method of backing up electronic memory with a battery in an industrial controller having an electronic processor communicating with the electronic memory via logic level lines. The logic level lines include shared logic level lines, which are also connected to devices other than the electronic memory, and at least one chip select line which when asserted enables the electronic memory for reading or writing. In the method, imminent power failure to the electronic processor is detected. Upon such detection, a current path between the shared lines and a ground voltage is provided to pull the shared lines to the ground voltage prior to complete loss of power. At the same time the chip select line to the electronic memory is de-asserted also prior to the complete loss of power.

Thus, it is one object of the invention to ensure that spurious signals are not provided to the electronic memory as power fails to the electronic processor. Pulling the shared lines to ground serves the dual purpose of preventing illegal state signals to the electronic memory, such as may cause increased power consumption, and of preventing current flow through the diode protection networks of other devices which may be connected to the shared lines.

The chip select line may be de-asserted by providing a current path between the chip select line and a battery voltage source to pull the chip select line to the battery voltage.

It is thus another object of the invention to accommodate chip select lines that are de-asserted in a high state. By tying the chip select line to the battery voltage there is no risk of forward biasing the protection diodes on the volatile memory.

The method may be implemented within the integrated circuit of the electronic processor which has a main voltage input line providing a main voltage source to the electronic processor and a battery voltage input line providing a backup battery voltage source to the electronic processor. A power failure line may provide a power failure signal indicating imminent failure of the main voltage source. Logic circuitry operating on the main voltage source provides a signal which may be received by a tri-state driver which also receives the power failure signal and the main voltage. The tri-state driver provides a logic level signal to a logic level line based on the output signal from the logic circuitry except when the power signal is received and then the tri-state driver provides a high impedance to the logic level line. A voltage controlled pull down resistor connected between the logic level line and a ground receives the power failure signal to change from a high to a low impedance.

In a second embodiment, a voltage controlled pull up resistor may also be included, the resistor connected between the logic level line and the main voltage line and receiving the power failure signal to change from a high to a low impedance.

Thus, it is another object of the invention to provide an electronic processor suitable for use with a battery backed-up volatile memory where the necessary additional circuitry may be incorporated directly into the integrated circuit of the electronic processor.

It is another object of the invention to provide a method of effectively disconnecting a volatile electronic memory that is operating on backed-up battery power from the remainder of the circuit without introducing additional delays in the transmission of signals to and from the electronic memory. By pulling down the line's output from the electronic processor and actively de-asserting the chip select line, the electronic memory may be effectively disconnected without interposing additional gate delays. The FETs, used to pull down the various lines, are not in series with those lines and thus do not significantly delay signals transferred along the lines.

The electronic processor may be on a circuit card connected to the industrial controller via a multi-line electrical connector. The multi-line electrical connector may connect the main voltage input line and the power failure line to at least one power supply located off the circuit card. The main voltage input line may be connected via a FET to an energy storage capacitor on the circuit card and the power failure line connected to a pull down resistor on the circuit card so that when the multiple line electrical connector is disconnected, the power failure line drops in voltage to ground before the voltage input lines drop in voltage to ground.

Thus it is another object of the invention to provide a reliable power failure signal to the electronic processor before the complete failure of electrical power to permit the processor to move the state of its logic level lines to the proper condition prior to loss of power.

The circuit card may include an adjustable current control, interposed in the main voltage input line between the power supply and the electronic processor, and controlling the current passing through the main voltage input line to the electronic processor. A connection detector circuit may detect the complete connection of the multi-line connector to produce a connection signal which is provided to a timer. The timer produces a power on signal to control the adjustable current control and delay the current flow in the main voltage input line by a predetermined amount of time after a complete connection of the multi-line connector.

Thus, it is another object of the invention to provide a more robust method of eliminating arcing on connector pins by waiting for the connection between the industrial controller and its circuit card to stabilize before connecting power.

The adjustable current control may provide a predetermined maximum rate of current increase in the main input voltage line in response to the power on signal from the timer.

Thus, it is another object of the invention to reduce high in-rush currents to uncharged capacitors on the circuit card such as may disturb the power supply feeding other cards in the industrial controller.

The multi-line connector may have long and short pins. The long pins provide electrical connection between the circuit card and the industrial controller before the short pins when the card is engaged with the industrial controller. The connection detector may detect complete connection by detecting current flow in a loop passing through two lines of the multi-line connector which employs short pins.

Thus, it is another object of the invention to ensure the initial stages of insertion of the card have been completed prior to applying power to the card and to provide a power loss signal prior to the card being fully disengaged. Such an early power loss signal is necessary to ensure that the lines to the electronic memory have reached the proper state prior to battery backup.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Control Environment

Figure 1:
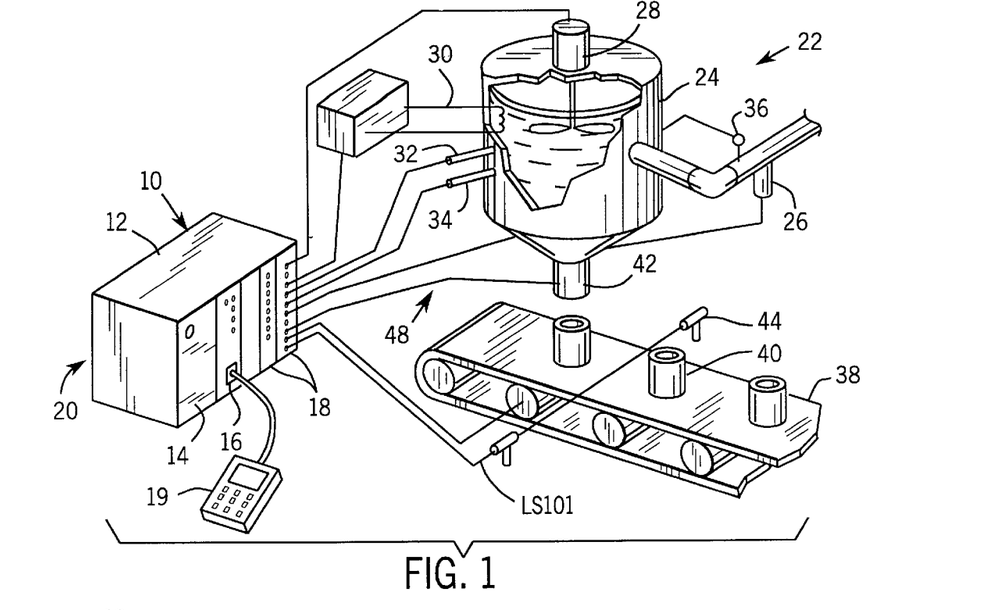
FIG. 1 is a perspective view of a simplified industrial control application including control of a conveyor line by an industrial controller of the present invention and showing a handheld terminal for programming and editing the program for the industrial controller.

Referring now to FIG. 1, an industrial controller 10 for use with the present invention may execute a control program expressed as a relay ladder diagram so as to control a number of elements on controlled equipment 22.

In the process example shown, I/O modules 18 are connected to sensors and actuators on a mixing tank 24 to control the flow of materials into the tank via a valve 26 and the temperature and agitation of those materials via an agitator 28 and a heater 30 under feedback control based on signals obtained from a thermocouple 32, a pressure transducer 34 and a flow sensor 36.

The industrial controller 10 also controls, in this example, a conveyor belt 38 having cans 40 to be filled from the tank 24, a spigot 42 from the tank 24, and the positioning of the conveyor belt 38. The industrial controller 10 receives signals from a limit switch 44 shown as a photoelectric beam so as to correctly position the containers under the spigot 42 for filling.

These control processes may be time sensitive and thus it is important that the industrial controller 10 execute its control program efficiently.

Attached to the industrial controller 10 is programming terminal 19 which provides a method of programming the industrial controller 10 with a relay ladder logic diagram and of editing that program as will be described. The relay ladder logic diagram is displayed on the terminal 19 and transmitted to the industrial controller 10 for storage in memory. It will be understood that the terminal 19 alternatively may be a desk-top unit remote from the industrial controller 10 but linked to the industrial controller for the communication of the relay ladder logic diagram.

Controller Hardware

Figure 2:
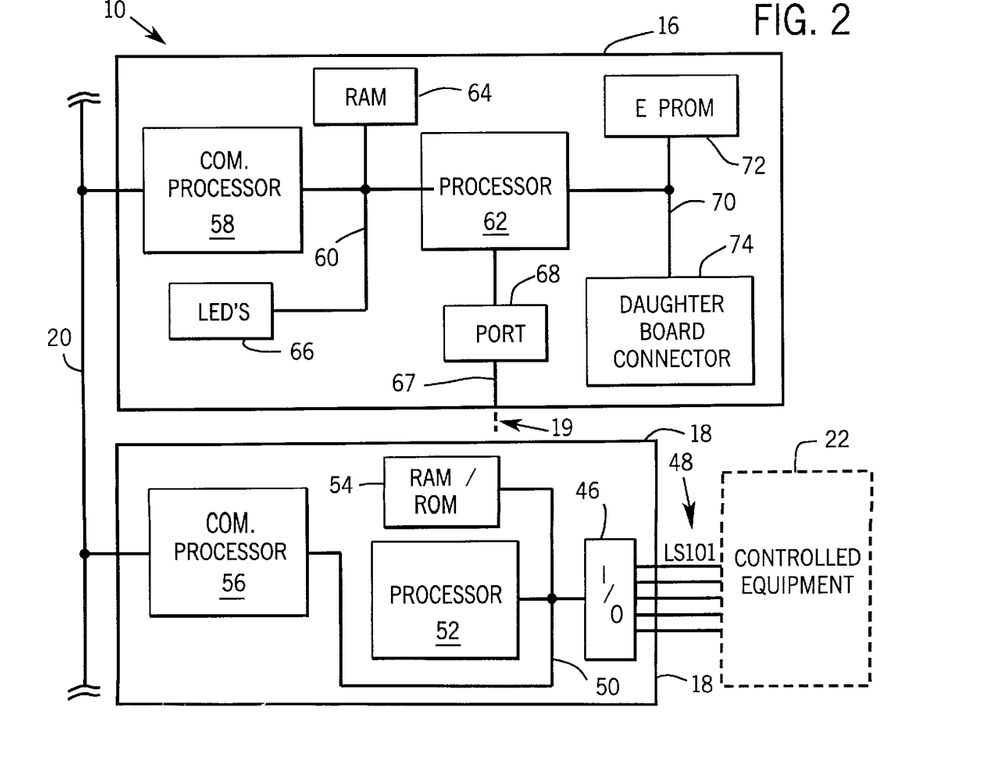
FIG. 2 is a block diagram of the controller of FIG. 1 showing the functional modules connected to a common backplane including a processor module, I/O module, and the latter's connection to the controlled equipment of FIG. 1.

Referring to FIGS. 1 and 2, the industrial controller 10 includes generally a rack 12 holding one or more controller modules including a power supply 14, a processor module 16 and one or more input/output, "I/O" modules 18 connected together via a backplane 20 passing the rear of the rack 12. The backplane 20 provides both data lines for the transmission of digital data between the modules and power lines for the transmission of power to the modules as will be described.

I/O modules such as 18 are generally known in the art and operate to receive signals and transmit them to the processor module 16 under the operation of their processor 52. The processor module 16 receives inputs from controlled equipment 22 via the I/O modules 18 and provides outputs to the controlled equipment 22 by those same I/O modules 18.

The signal lines 48 from the controlled equipment 22 are received by the I/O module 18 at interface circuitry 46. The interface circuitry 46 contains protection circuitry, such as optical isolators, and conversion circuitry, such as analog-to-digital or digital-to-analog circuitry, for converting the I/O signals 48 to digital representations that may be transmitted on an internal bus 50 of the I/O module 18.

The internal bus communicates with an I/O module processor 52, a memory unit 54 composed generally of random access and read-only memory (RAM/ROM) and a communication processor 56 connecting the I/O module 18 to a high-speed backplane 20 for communication with other modules, and in particular, the processor module 16. Processor 52 thus may receive instructions and programming from the processor module 16 as will be described below. The I/O module 18 may be constructed according to methods well understood in the art.

A communication processor 58 in the processor module 16 handles the communication protocols of the high-speed backplane 20 and relays information between that high-speed backplane 20 and an internal bus 60 of the processor module 16. The internal bus 60 is also connected to the processor 62 of the processor module as well as random access memory ("RAM") 64 and a front panel LED display 66. The processor 62 provides a separate serial port 68 used for diagnostics and programming and another internal bus 70 communicating with erasable programmable read-only memory (EPROM) 72 and a daughter board connector 74 which may be used for memory expansion on a separate card.

Battery Backed-up Memory

Memory to Processor Connections

Figure 3:
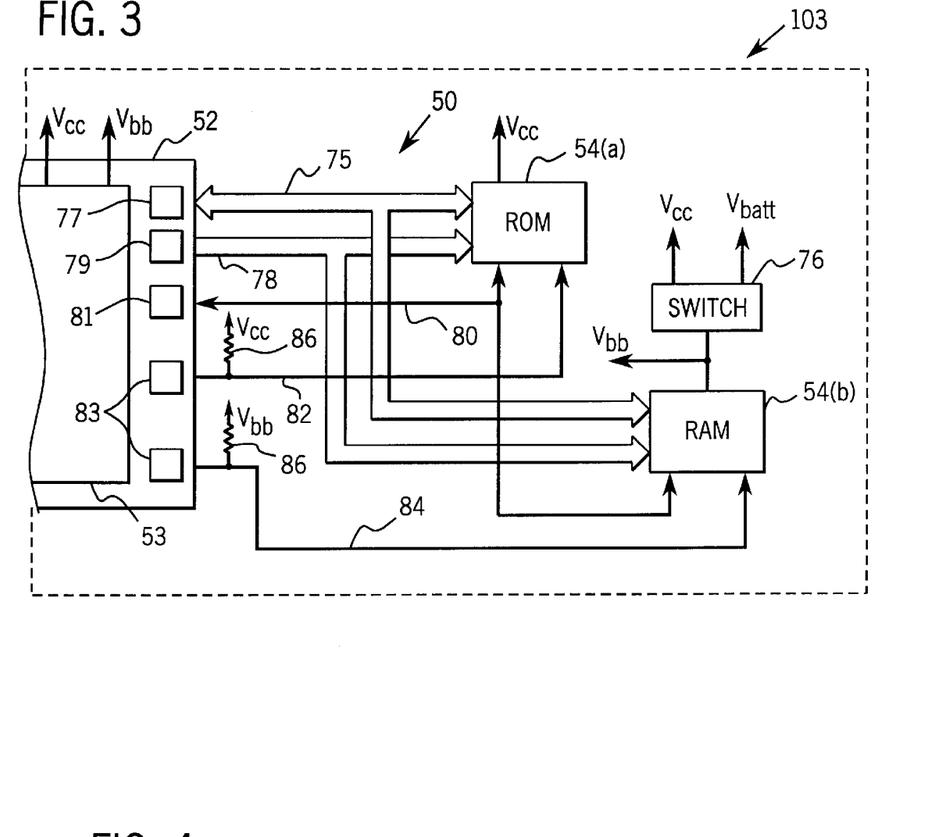
FIG. 3 is a schematic representation of a typical functional module, such as shown in FIG. 2, showing the lines between the processor and memory connected to the processor an their division among various pad types.

Referring now to FIG. 3 in a typical module 103 the processor 52 communicates with a separate ROM 54A and RAM 54B. The processor 52 is powered from a main voltage source line $V_{cc}$, as is ROM 54A, whereas RAM 54B is powered by either of $V_{cc}$ or a battery voltage $V_{batt}$ as switched by a switch circuit 76. The switch circuit 76 may consist of a simple diode network allowing a voltage $V_{bb}$ to be supplied to RAM 54B by the greater of $V_{cc}$ or $V_{batt}$.

The processor 52 is connected to the ROM 54A and RAM 54B by a number of lines which together form an internal bus 50. First, the processor 52 communicates with the ROM 54A and RAM 54B by means of data lines 75 which provide data from the processor 52 to either of the ROM 54A or RAM 54B during a write cycle and receive data from either ROM 54A or RAM 54B during a read cycle. Data lines 75 are bi-directional and terminate at processor 52 at pads 77 as will be described.

Second, the processor 52 provides address lines 78 which designate the location in the ROM 54A or RAM 54B at which memory is to be read from or written to. Address lines 78 are uni-directional, that is, addresses are only output from the processor 52 and not read by the processor 52 and are driven by pads 79 in the processor 52 to be described below.

Third, one or more control lines 80 also interconnect the processor 52 and the ROM 54A and the RAM 54B. These control lines 80, such are well known in the art, may include, for example, read and write lines indicating whether data is to be read from or written to the particular device such as ROM 54A or RAM 54B. The control lines 80 are driven by pads 81 in the processor 52 as will be described below.

The data lines 75, address lines 78 and control lines 80 are shared lines, the same lines going to both the ROM 54A and RAM 54B and in the general case also to other devices on the bus 50. In the preferred embodiment the address and data lines convey data in both the high and low state, a write line is asserted in the low state to indicate a write to the memory and a read line is asserted in the low state to indicate a read from the memory.

In addition to the above shared lines 75, 78, and 80, two "chip select" lines 82 and 84, which are not shared lines, go to only one of ROM 54A and RAM 54B, that is, chip select line 82 goes to ROM 54A and chip select line 84 goes to RAM 54B. The chip select lines 82 and 84, as are well understood in the art, are used to identify the particular device selected for data transfer, either ROM 54A or RAM 54B, and in this embodiment select that device when they are in the low state, that is, near zero volts as opposed to the high state of typically 5 volts. These chip select lines 82 and 84 are driven by pads 83 as will be described below and have an external pull up resistor 86 connected between the pad 83 and $V_{bb}$.

Figure 4:
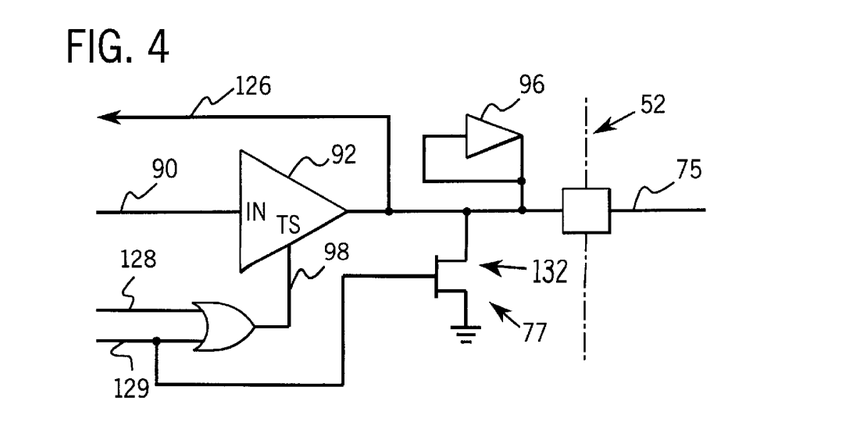
FIGS. 4 through 7 are schematic representations of the pad types of FIG. 3 for the various lines of FIG. 3.

Referring now to FIGS. 3 and 4, each data line 75 includes separate driver circuitry contained on a pad 77 of the integrated circuit of the processor 52. Because the data lines 75 (and address lines 78) are configured in a parallel arrangement, multiple pads 77 (and 79) simultaneously drive multiple lines 75 (or 78) for parallel data transmission. Only one pad of each type will be described herein as the others will be duplicates of this line.

A. Data Lines

During normal operation of the data lines 75, a logic signal is received at a pad input 90 as is provided by the internal logic 53 of the processor 52. This input signal 90 is input to a tri-state driver 92 such as is well known in the art. The tri-state driver 92 provides one of three outputs, a current source, a current sink or a high impedance (neither current sinking nor current sourcing) depending on the pad input signal and the state of a tri-state signal 98. When the tri-state signal is not asserted, and the pad input signal 90 is a logical TRUE, the tri-state driver sources current to the line 75 and when the pad input signal 90 is in the low state the tri-state driver 92 sinks current from the line 75.

Because the input impedance to the inputs of the RAM 54 is extremely high, when the tri-state driver 92 is in a high impedance state, the voltage on the data line 75 can wander between high and low logic levels and hence a defined value of the voltage on line 75 is not ensured. Voltage levels at the input of the RAM 54B that are midway between logic levels can cause excessive current consumption by the RAM 54B and other similar devices. For this reason, data lines 75 may be connected to a repeater circuit 96, well known in the art, which serves to keep the voltage level of the line 75 from floating between either logically high or logically low voltage values. The repeater 96, depending on the voltage on the line 75, sinks or sources current into the line 75 to move the voltage of the line 75 further in the direction in which it is predisposed. The current output of the repeater 96 is limited, however, so that another active output may easily move the line 75 to another state against the action of the repeater 96. Thus the tri-state output 92 overrides the repeater 96 when it is sinking or sourcing current.

The data line 75 is also received by an input line 126 which connects to a separate input circuit (not shown) when data is being received by the processor 52.

When the tri-state input 98 is asserted, regardless of the pad input signal 90, the tri-state driver 92 assumes the high impedance state. In this case, the voltage value of line 75, absent other connections, will be determined by the repeater 96 based on the last voltage on line 75. The high impedance state is assumed, for example, during a reading of data from ROM 54A or RAM 54B when a sinking or sourcing of current would interfere with the signal being asserted by the ROM 54A or RAM 54B.

According to the present invention, the tri-state line 98 is also asserted upon the receipt of a delayed power failure signal termed the RESET_L signal 131. The RESET_L signal 131, as will be described below, indicates generally that power is being lost and that RAM 54B will soon switch to battery backup. At this time the RESET_L signal 131 also activates a FET 132 connected between the line 75 and ground to create an effective pull down resistor between the line 75 and ground. This pull down "resistor" of FET 132 has sufficient current capacity to override the repeater 96 and to pull the data line 75 low, low being the asserted state but also the state which will not cause current flow through the protection diodes of the ROM 54A as $V_{cc}$ drops to zero. The low state also ensures that excessive current consumption by the RAM 54B will not occur, such as might occur if a voltage between the high and low states were produced on line 75.

B. Address Lines

Figure 5:
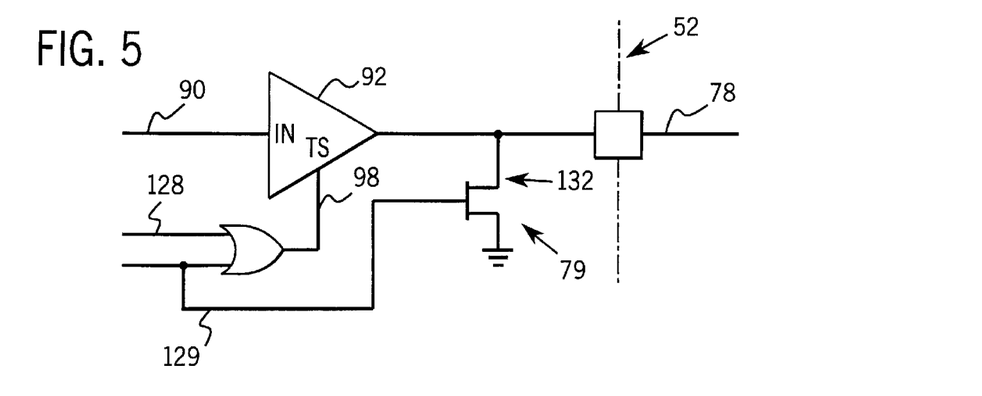

Referring now to FIGS. 3 and 5 the same basic driver circuit may be used for the address lines 78 which are identical to the data lines but for the absence of the repeaters 96 in the address lines 78. Again the operation of the circuit on power failure is the same as that of FIG. 4 with the pad input signal 90 being deasserted and the tri-state driver 92 going to the high impedance mode and pull down FET 132 being activated to pull line 78 to ground. A repeater is not necessary here because the address lines 78 are only written to by the processor 52 and hence there is no reason during normal operation to put the tri-state driver 92 into the high impedance state.

C. Control Lines

Figure 6:
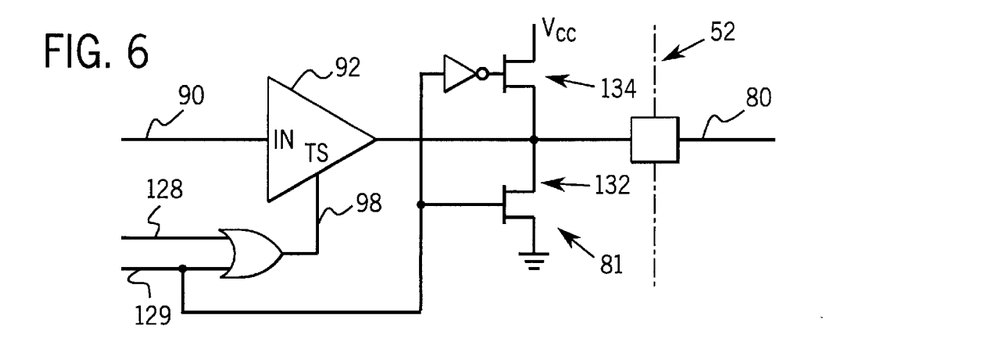

Referring now to FIGS. 3 and 6, a different form of this driver circuit is used for the control lines 80 which are normally de-asserted by an FET pull up "resistor" 134 connected between the line 80 and $V_{cc}$ when not driven. Here again, the RESET_L signal 131 causes the tri-state driver 92 to go into the high impedance mode. But unlike the circuit of FIGS. 4 and 5, the RESET_L signal 131 also turns off the pull up resistor 134 while simultaneously activating a pull down FET 132 connected between the line 80 and ground, as described above. The net effect is similar: during a power loss lines 80 are pulled low.

D. Chip Select Lines

Figure 7:
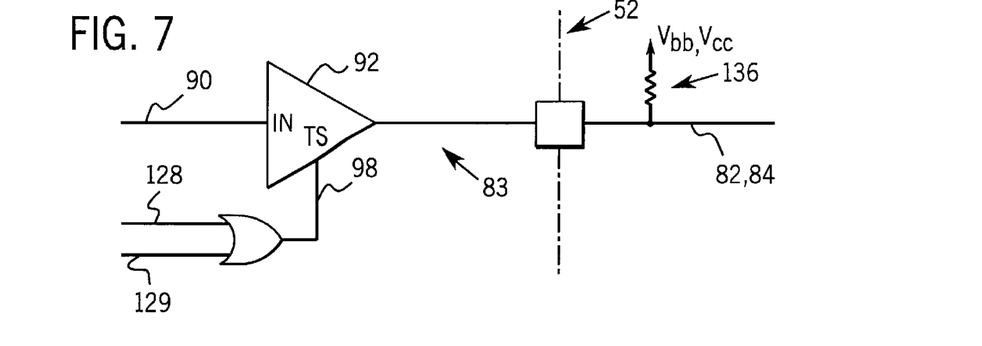

Referring now to FIGS. 7 and 3 the chip select lines 82 and 84 must be treated differently in this case because the pulling low of the address and data lines does not de-assert those lines and hence if the RAM 54B is selected by its chip select line 84 erroneous modification of the contents of the memory could occur. Nevertheless, because the chip select lines 82 and 84 go only to one device, there is no danger of the chip select line of a battery backed-up device sourcing current to the input protection diodes of other unpowered devices.

In the driving circuits for the chip select lines 82 and 84, as before, either the tri-state signal 128 or the RESET_L signal 131 when asserted put the tri-state driver 92 into the high impedance mode. Prior to this time, however, an undelayed power failure signal, termed the DC_FAIL_L signal 130, has been received by the processor 52 to de-assert the pad inputs 90 so at the time of receipt of the RESET_L signal 131 there is no abrupt change in the state of the chip select line. Further, and in contrast to the other circuits, an external pull up resistor 136 is used to pull the line 82 or 84 up when the tri-state driver 92 is in the tri-state but only to a voltage commensurate with the voltage expected to appear on the chip to which the line 82 or 84 is connected. Thus for the RAM 54B which is expected to be at $V_{bb}$, pull up resistor 136 is connected between the line 84 and $V_{bb}$. In contrast the chip select line 82 for ROM 54A has line 82 connected to pull up resistor 136 to $V_{cc}$. Hence as $V_{cc}$ drops so does the voltage on the chip select line and no current is conducted by the protection diodes of the ROM 54A.

It should be noted that the additional pull up and pull down FETs of the circuits of FIGS. 4–7 as activated by the RESET_L signal 131 are not interposed between the tri-state drivers 92 and the lines they connect to. Thus no additional gate delay is imposed by the power failure circuitry.

The pull up and pull down FETs, to the extent necessary, may be powered by $V_{bb}$ through a separate power line received by the processor 52. Thus, the pulling down of the respective lines can be ensured even when $V_{cc}$ drops to zero and no current would be available from the $V_{cc}$ power supply.

Development of the Power Failure Signals

Figure 8:
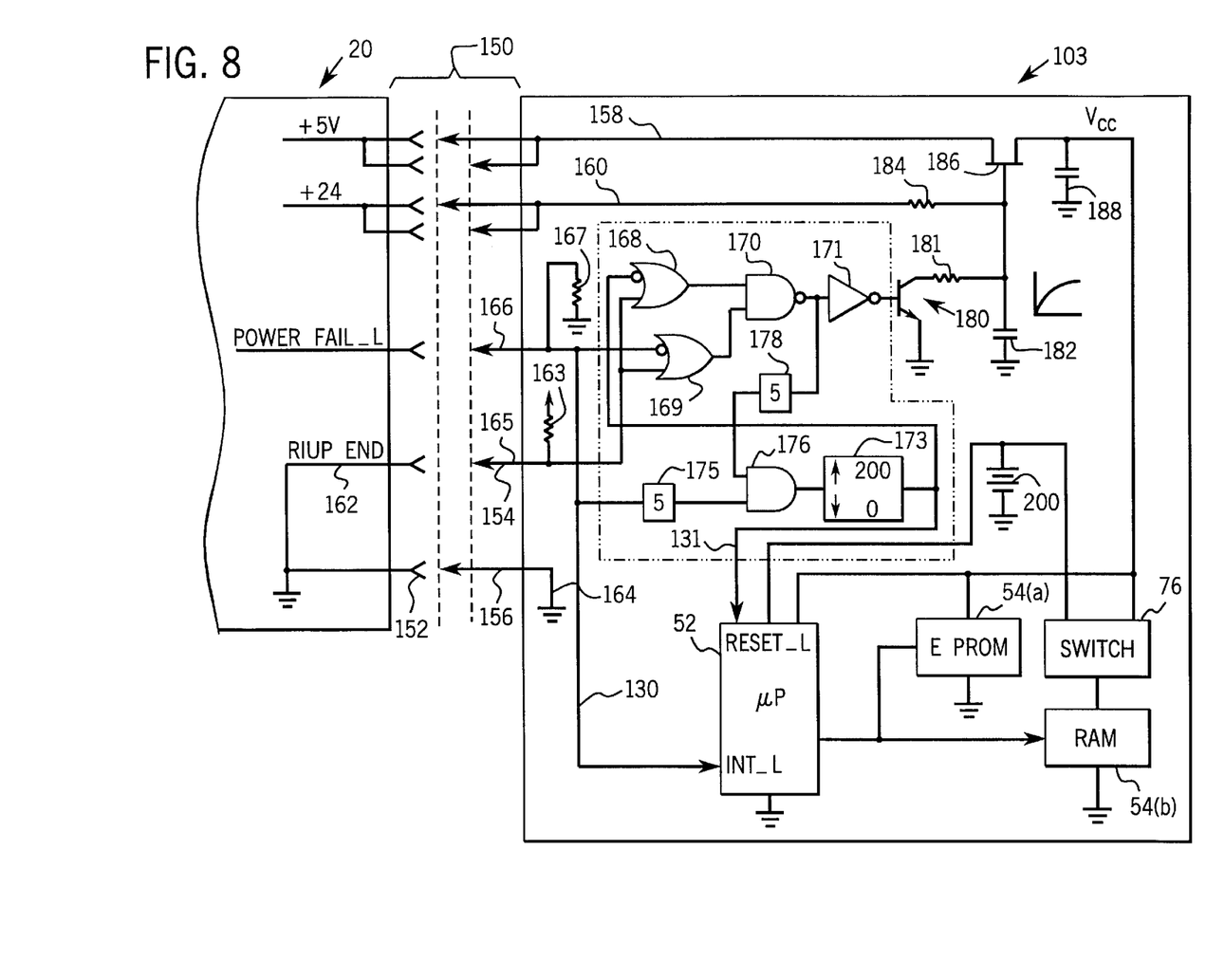
FIG. 8 is a detailed schematic of a functional module such as shown in FIGS. 2 and 3 indicating the various connections between the functional module and the connector of the backplane as is used to control the application of power to the functional module upon insertion of the functional module into the backplane.

Referring now to FIG. 8, the RESET_L signal 131 and the DC_FAIL_L signal 130 described above are generated by additional circuitry on the module 103. The functional module 103 connects to the backplane 20 by means of a connector 150 having electrically conductive connector sockets 152 and pins 154 and 156. The sockets 152 are attached to conductors within the backplane 20 and receive the pins 154 and 156 attached to the circuitry of circuit card 103.

The pins are of two lengths: long pins 156 and short pins 154. The sockets 152 allow overtravel of the long pins 156 so that the short pins 154 will also engage sockets 152 when the circuit card 103 is inserted into the backplane 20, albeit at a time somewhat later than the engagement of long pins 156 with sockets 152.

In addition to data and address lines generally providing communication between the modules as described with respect to FIG. 2, the backplane 20 provides a five volt power supply brought out as two sockets 152 in the connector 150, as well as a 24 volt power supply also provided with two sockets in the connector 150. A short and long pin 154 and 156 engage the sockets connected to the five volt power supply to provide a five volt power rail 158 at the circuit card 103. Likewise a short and long pin 154 and 156 engage the two sockets of the 24 volt power supply of the backplane 20 to provide a 24 volt power rail 160 at the circuit card 103.

The ground for both the five and 24 volt supplies on the backplane 20 is brought out in two sockets 152, the first engaged by a short pin 154 to provide an RIUP ground 162 and the second socket 152 receiving a long pin 156 to provide a board ground 164. A power failure signal 159 on the backplane 20, normally having a positive five volts but dropping to ground in the event of a DC failure, is connected by a short pin 154 to a power failure line 166 on the circuit card 103.

The RESET_signal 131 and the DC_FAIL_L signal 130 used on the circuit card 103 and described above, are derived from the power failure signal 159 and the RIUP ground 162.

Specifically, the power failure signal 159 and the RIUP ground 162 connect to the card 103 via short pins on the card 103 to provide power failure line 166 and RIUP ground line 165. The power failure line 166 is connected to a pull down resistor 167 on the card 103 so that when it is disconnected from the backplane 20, it is pulled to a low state to provide the DC_FAIL_L signal 130 on line 166. The RIUP ground line 165 is attached on the card to a pull-up resistor 163 so that when it is disconnected (but there is otherwise power to the card 103) it is pulled to a high state. The RIUP ground line 165 is in turn received by one noninverting input on each of two, dual input OR gates 168 and 169. A second inverting input of OR gate 169 connects to the DC_FAIL_L signal 130 which is also connected to an interrupt input of the microprocessor 52. In this way the microprocessor 52 may monitor the status of this line directly, as will be described. A second inverting input of OR gate 168 is connected to the output of a edge discriminating delay 173 as will be described.

The outputs of the OR gates 168 and 169 are received by corresponding inputs of a dual input NAND gate 170 whose output is connected to an invertor 171 which in turn connects to the base of an NPN transistor 180. The emitter of the NPN transistor 180 is connected to board ground 164 and its collector is connected through resistor 181 to one side of a timing capacitor 182 whose other side is connected to board ground 164. The ungrounded side of timing capacitor 182 receives current through resistor 184 from the 24 volt power rail 160 when the circuit card is connected to backplane 20.

Thus, the NAND gate 170 controls the discharge of capacitor 182. The ungrounded side of timing capacitor 182 connects the gate of an FET 186 whose source and drain are placed in series between the 5 volt supply 158 and all the remaining circuitry on circuit card 103 that uses 5 volts (i.e., $V_{cc}$) and in particular a number of filter capacitors represented in FIG. 8 as a single filter capacitor 188. When the voltage on the timing capacitor 182 is low, the FET 186 is off, disconnecting the power supply of the backplane 20 from the circuitry of the circuit card 103 including the processor 52 and memories 54.

The size of resistor 184 and timing capacitor 182 is adjusted so that the FET 186 will not be turned on and allow current to flow to the filter capacitors 188 until approximately 10 milliseconds after NAND gate 170 produces a low output. If during that 10 millisecond period the NAND gate signal becomes high, transistor 180 rapidly discharges timing capacitor 182 and the timing cycle is started anew. As will be seen, the timing circuit of resistor 184 and timing capacitor 182 eliminate the problem of insertion jitter such as may connect and disconnect the connector 150 over a short period of time.

The FET 186 receives a gradual increase in its gate voltage caused by the charging of timing capacitor 182 and produces a corresponding ramping up of the current flowing through the five volt line 158 to the circuit card 103 such as prevents voltage disturbance on the five volt power line in the backplane 20 such as may adversely affect other modules attached to that backplane 20.

The DC_FAIL_L signal 130 is also received by a 5 millisecond delay block 175 which in the preferred embodiment is implemented by inputs and outputs from the microprocessor 52 but which is depicted separately for clarity. It will be understood in the art that the delay function could be accomplished readily with discrete circuitry.

The output of the delay 175 is received by one input of a two input AND gate 176 whose other input is also from a 5 millisecond delay 178 which is attached to the junction of NAND gate 170 and invertor 171. The output of the AND gate 176 is received by the input of the edge discriminating delay 173. The latter which operates to introduce a 200 millisecond delay in the signal it receives at its input, if that signal is a rising edge (positive transition) from low to high. A falling edge (negative transition) from high to low is passed through without delay.

The output of the edge discriminating delay 173 is connected to the remaining inverting input of OR gate 168 and is also received as a reset line to microprocessor 52 as the RESET_L signal 131 which triggers the tri-state line 129.

The operation of these circuits will be described further below but generally served to determine when electrical power should be applied to the majority of the circuits on the circuit card 103. The application of power to the card 103 is thus independent from its connection and disconnection to the backplane 20.

The operation of the above circuitry under several conditions will now be described:

1. Power Resumed With Circuit Card Installed

Turning on power to the backplane 20 when the circuit card 103 has been previously installed in backplane 20 causes the 5 and 24 volt power supplies to reach their proper voltages and shortly thereafter the power failure signal 159 to change from a low to a high state. Immediately prior to the change in the power failure signal 159, the transistor 180 is turned on (as powered by the stabilized supplies) as a result of the outputs of OR gates 168 and 169 being high. When the power failure signal 159 goes high, indicating that the power supplies on the backplane 20 have stabilized, the output of OR gate 169 goes low causing the output of NAND gate 170 to go high and transistor 180 to turn off allowing timing capacitor 182 to begin charging. Approximately 10 milliseconds later power is applied to the filter capacitors 188 and the circuit card 103 is powered up.

The positive transition of the power failure signal 159 also causes the input of AND gate 176 to move to a high state. The delay of delay 175 as implemented by the microprocessor is sensitive only to negative transitions and does not delay positive transitions (from low to high). The second input of the AND gate 176 receives a high from the junction of NAND gate 170 and invertor 171. The output of AND gate 176 then produces a high which triggers the edge discriminating delay 173 to provide a 200 millisecond delay on a positive transition. If the DC_FAIL_L signal 130 goes low before the 200 milliseconds expires, the time delay 173 is reset and will delay a full 200 milliseconds when DC_FAIL_L signal 130 goes high. Thus, 200 milliseconds later, the inverting input OR gate 168 provides a low to NAND gate 170. This change of state of OR gate 168 does not affect transistor 180, however, it will maintain the status of NAND gate 170 in the event that the DC_FAIL_L signal 130 is driven low again by the power supply (thereby maintaining power to the board). The output of the edge discriminating delay 173 is also received by the microprocessor 52 as the RESET-L signal 131 which causes the pads 79 to release their power down states and adopt their normal operating states as has been described above.

2. Power Loss With Circuit Card Installed

When power is lost either because the industrial controller 10 has been switched off or there has been a failure of the power supply, then at least 5 milliseconds prior to failure of the 5 and 24 volt power supplies the power failure signal 159 goes low causing the inverting input of OR gate 169 to go high and the output of OR gate 169 to go high. Transistor 180 remains off, however, because the output of OR gate 168 remains low as connected to the edge discriminating delay 173.

The edge discriminating delay 173 remains high because the delay 175 has delayed the down edge of the DC_FAIL_L signal 130 by 5 milliseconds. This 5 milliseconds provides time for the microprocessor 52, which is triggered on the falling edge of the DC_FAIL_L signal 130, to place the pad input signals 90 of its pads in the proper condition for a power down as has been described above. At the end of 5 milliseconds the falling edge of the DC_FAIL_L signal 130 reaches the edge discriminating delay 173 and the output of the edge discriminating delay 173 drops immediately to zero causing FET 186 to be turned off—effectively disconnecting the card 103 from the power supplies on backplane 20 by discharging capacitor 182 and thereby turning off FET 186. The rate of discharge of capacitor 182 is controlled by resistor 181 to allow time for the microprocessor 52 to drive the address and data lines to zero volts before RAM 54(b) is switched to $V_{batt}$ through switch 76. The output of the edge discriminating delay 173 also provides the RESET_L signal 131 to the microprocessor forcing its pads into the proper state to preserve the memory on RAM 54(b) as has been described above.

3. Circuit Card Inserted With the Backplane Under Power

The first pins 156 of card 103 contacting backplane 20 provide 5 volt, 24 volt and ground power connections to the card 103. The pull up resistors attached to lines 166 and 165 then pull those lines low and high respectively causing transistor 180 to turn on discharging timing capacitor 182 so that power does not flow to the card 103. When both the lines 166 and 165 are connected to the respective backplane connections, power is applied to the card 103 in substantially the same manner as occurs with a power up while the card is connected.

Figure 9:
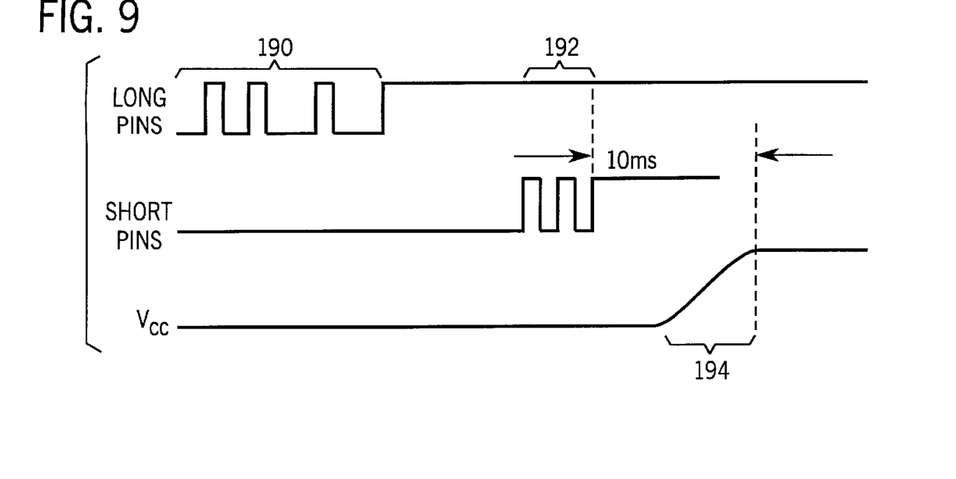
FIG. 9 is a timing diagram showing the relationship between the connection of the long and short pins of the connector of FIG. 8 to the application of power to the functional module.

One exception may be noted with respect to FIG. 9. Referring now to FIG. 9, as the long pins 156 are engaged there may be a rapid engaging and disengaging during period 190 caused by uneven insertion of the circuit card 103 to the backplane. Although the long pins 156 provide five volt power and ground to the circuit card 103, no substantial current flows to the circuit card 103 because the FET 186 is off so this period 190 does not significantly affect the stability of the five volt power supply. At a subsequent period 192 the short pins 154 engage, also, producing some "jitter" of engaging and disengaging during period 192. When the jitter has stopped for 10 milliseconds the capacitor 182 gradually switches on the FET to provide a ramping-up of current to $V_{cc}$ during period 194.

4. Circuit Card Removed With The Backplane Under Power

If the card 103 is removed under power, then while the power supply and ground connections of the long pins 156 are still intact, the lines 166 and 165 become disconnected. The effect of this is to cause the output of OR gates 168 and 169 to rise to the TRUE state turning on transistor 180 to discharge capacitor 180 and disconnect the card 103 from power. The 5 millisecond delay 175 sees a negative transition as if DC_FAIL_L signal 130 had gone low, which is in fact caused by pull down resistor 167. The microprocessor 52 also sees this negative transition and begins to adjust its outputs to preserve RAM 54(b) as has been described above. Filter capacitors 188 are sized such that under normal power consumption at least 5 milliseconds of further operation of the microprocessor and its associated circuitry may be ensured even though the FET 186 is being turned off. The negative transition of the output of NAND gate 170 is delayed by delay 178 and together with the delay of delay 175 causes a 5 millisecond delay in the falling of the output of the edge discriminating delay 173 which provides the RESET-L signal 131 to tri-state the outputs of the microprocessor 52 and make the appropriate pull ups or pull downs as have been described above.

In order to apprise the public of the various embodiments that may fall within the scope of the invention, the following claims are made.

We claim:

1. A circuit card for insertion into and removal from an industrial controller, the circuit card comprising:

an electronic memory;

a processor providing an output to the electronic memory as a logic level signal on a logic level line;

a main voltage input line providing a main voltage source to the electronic processor;

a battery voltage input line providing a backup battery voltage source to the electronic memory;

a power failure line providing a power failure signal indicating an imminent failure of the main voltage source;

at least one tri-state driver receiving the power failure signal, the main voltage, and the output signal and providing the logic level signal to the logic level line dependent on the output signal except when the power failure signal is received and then providing a high impedance to the logic level line; and a pull-up resistor connected between the logic level line and the battery voltage input line to pull the logic level line to the battery voltage when the tri-state driver provides the high impedance;

wherein the electronic processor is connected to the industrial controller via a multi-line electronic connector, the multi-line electrical connector connecting the main voltage input line and the power failure line to at least one power supply located off the circuit card in the industrial controller and wherein the main voltage input is connected to an energy storage capacitor on the circuit card and the power failure line is connected to a pull down resistor on the circuit card so that when the multi-line electrical connector is disconnected, the power failure line drops in voltage to ground before the main voltage line drops in voltage to ground.

2. The electronic processor of claim 1 wherein the circuit card includes:

an adjustable current control interposed in the main voltage input line between the power supply and the electronic processor controlling the current passing through the main voltage input line to the electronic processor;

a connection detector circuit detecting complete connection of the multi-line connector to produce a connection signal;

a timer communicating with the connection detector circuit to provide a power on signal to control the adjustable current control and delay the current flow in the main voltage input line by a predetermined amount of time after a complete connection of the multi-line connector.

wherein the connection detector circuit detects complete connection by detecting current flow in a loop passing through two of the logic level lines of the multi-line connector.

3. The electronic processor of claim 2 wherein the multi-line connecter has long and short pins, the long pins making electrical connection between the circuit card and the industrial controller before the short pins when the circuit card is engaged with the industrial controller and wherein the loop passes through two lines of the multi-line connector employing short pins.

4. The electronic processor of claim 2 wherein the adjustable current control provides a predetermined maximum rate of current increase in the main input voltage line in response to the power on signal from the timer.

* * * * *